Dec. 8, 1925.　　　H. W. KIRCHNER　　　1,564,420

FREIGHT HANDLING SYSTEM

Filed June 6, 1923　　　2 Sheets-Sheet 1

Inventor.
HENRY W. KIRCHNER.
By Rodney Bedell
Atty.

Dec. 8, 1925.                                                              1,564,420
H. W. KIRCHNER
FREIGHT HANDLING SYSTEM
Filed June 6, 1923                    2 Sheets-Sheet 2
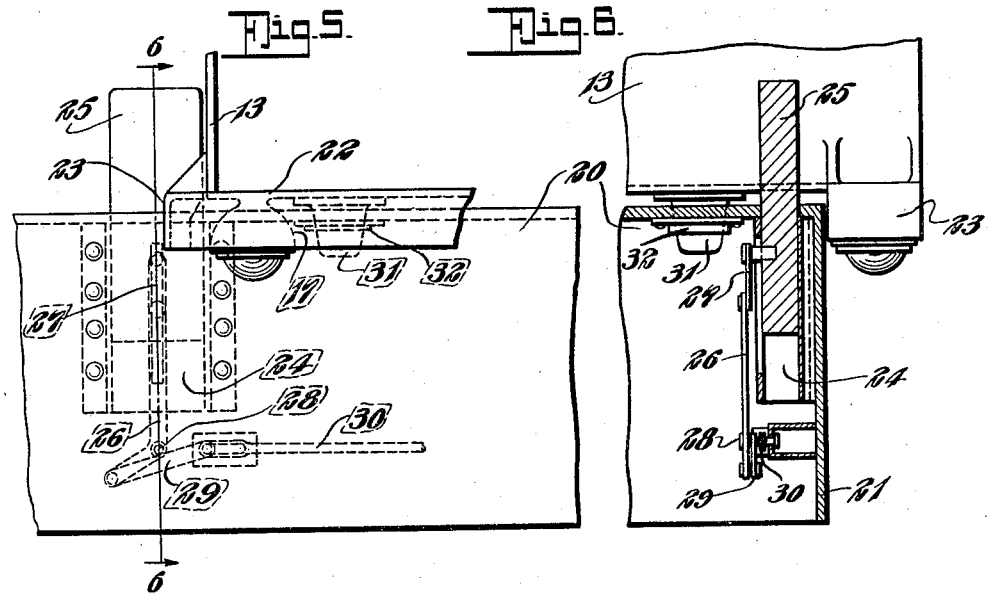
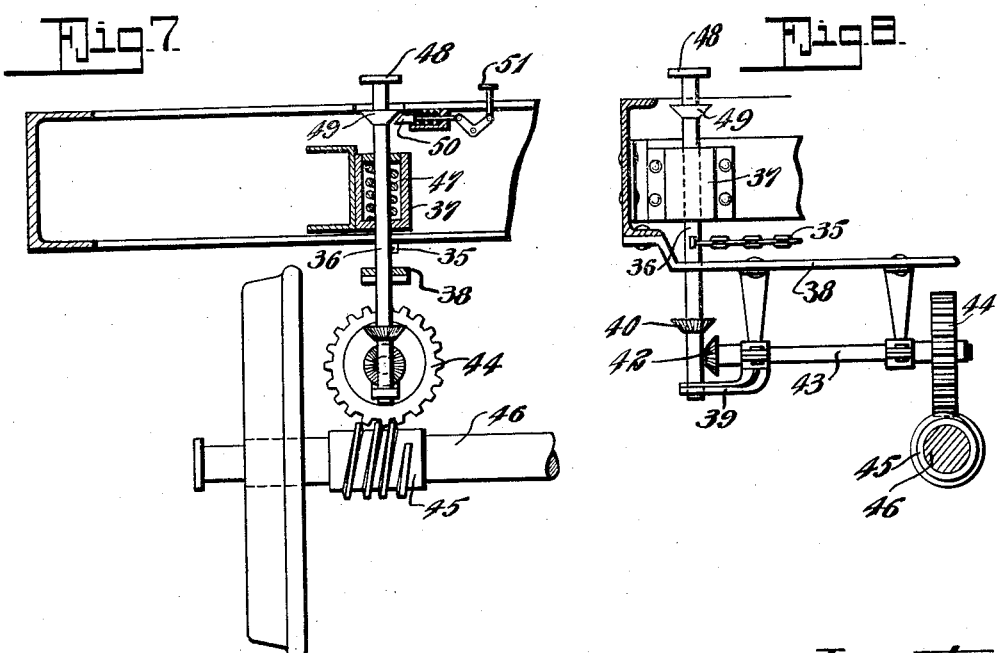
Inventor:
HENRY W. KIRCHNER.
By Rodney Bedell
Atty.

Patented Dec. 8, 1925.

1,564,420

UNITED STATES PATENT OFFICE.

HENRY W. KIRCHNER, OF ST. LOUIS, MISSOURI.

FREIGHT-HANDLING SYSTEM.

Application filed June 6, 1923. Serial No. 643,728.

*To all whom it may concern:*

Be it known that I, HENRY W. KIRCHNER, a citizen of the United States, residing at St. Louis, Missouri, have invented a certain new and useful Improvement in Freight-Handling Systems, of which the following is a full, clear, and exact description, such as will enable others skilled in the art to which it appertains to make and use the same, reference being had to the accompanying drawings, forming part of this application.

My invention relates to transportation systems in which the freight is carried in containers adapted to be mounted upon various types of carriers such as railroad cars, motor trucks, barges, and the like, which containers may be loaded and unloaded at the terminal points of the shipping.

The objects of such systems are to protect the freight against theft or other injury during transportation and to facilitate the handling of freight in less than carload lots by the shipper and consignee. By means of such systems, carriers may be loaded and unloaded in minimum of time and the tie-up of the carriers is eliminated.

The objects of my present invention are to provide improved facilities for loading and unloading the containers from the carriers; to provide means for handling classes of freight which are not necessarily enclosed during shipment, and to handle classes of freight which are of a nature which prevents their being packed in small containers, such as have hitherto been shown in such systems. I refer, for instance, to lumber, structural steel shapes, machinery, and other merchandise shipped in large units.

In the accompanying drawings which illustrate a selected embodiment of my system,—

Figure 1 is a plan view of a portion of a railroad terminal which is provided with trackage to accommodate carriers and containers of the type referred to.

Figure 5 is a detail elevation of the end of one of the containers mounted upon a carrier.

Figure 6 is a transfer section taken on line 6—6 of Figure 5.

Figures 7 and 8 are an end view and a cross section, respectively, of a brake operating mechanism for use in connection with the carriers illustrated in the previous figures.

Figure 1:
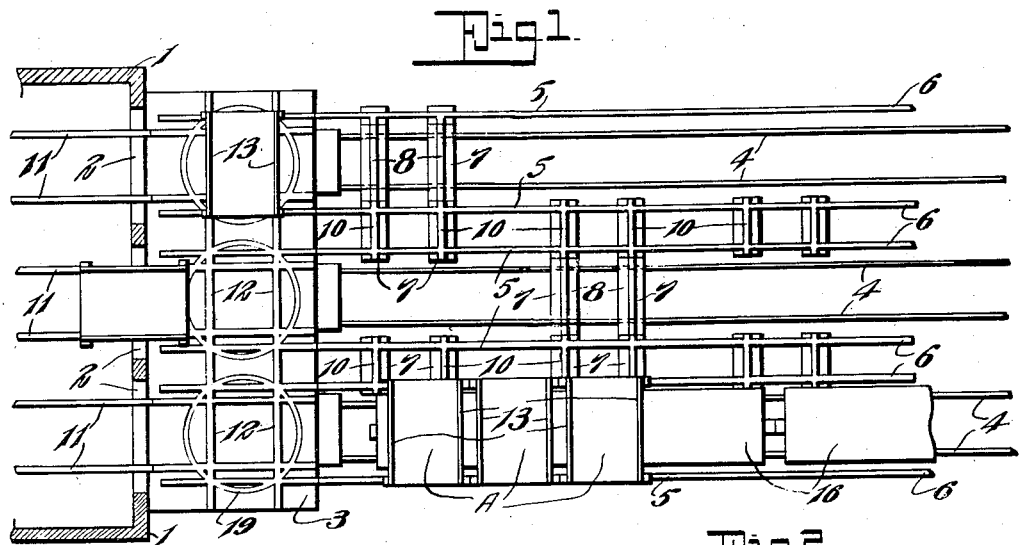

In Figure 1 warehouse walls are indicated at 1 and are provided with door openings 2 which open onto a platform 3 and a series of tracks located at the warehouse floor level. Parallel railroad tracks 4 running transversely of the warehouse wall and preferably aligned respectively with doors 2 of the warehouse are located on the ground level. At each side and above each of these tracks 4 are ramp tracks 5 which are horizontal for a substantial distance at a level approximately the same as the warehouse floor and beyond their horizontal portions are inclined downwardly as indicated at 6. The spaces between ramp rails 5 of the same track may be bridged by removable skids 7 which carry rails and may be positioned at different points to cooperate with permanent cross tracks 10 to provide transfer tracks for moving the containers from one ramp track 5 to another ramp track at various points in their length as indicated. Several such skids may be aligned with each other to form a continuous elevated track extending parallel with the warehouse wall. The warehouse floor is equipped with tracks 11 which extend over platform 3 beyond the warehouse door and between the ramp track rails 5 which latter are on a wider gauge than tracks 11. The objects of this difference in gauges will be explained below. Another track 12 on platform 3 extends transversely of tracks 11. The tracks 4 are standard railway gauge and are intended for the use of standard railway cars, as well as the specially equipped cars forming a part of my system.

Figure 2:
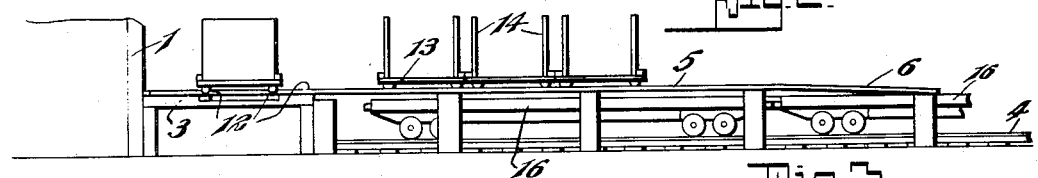
Figure 2 is an elevation of a portion of the system illustrated in Figure 1.
Figure 3:
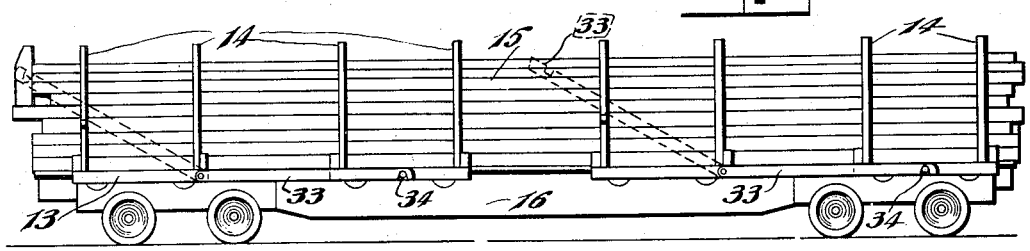
Figure 3 is a detail view of a carrier and its containers adapted to transport lumber.
Figure 4:
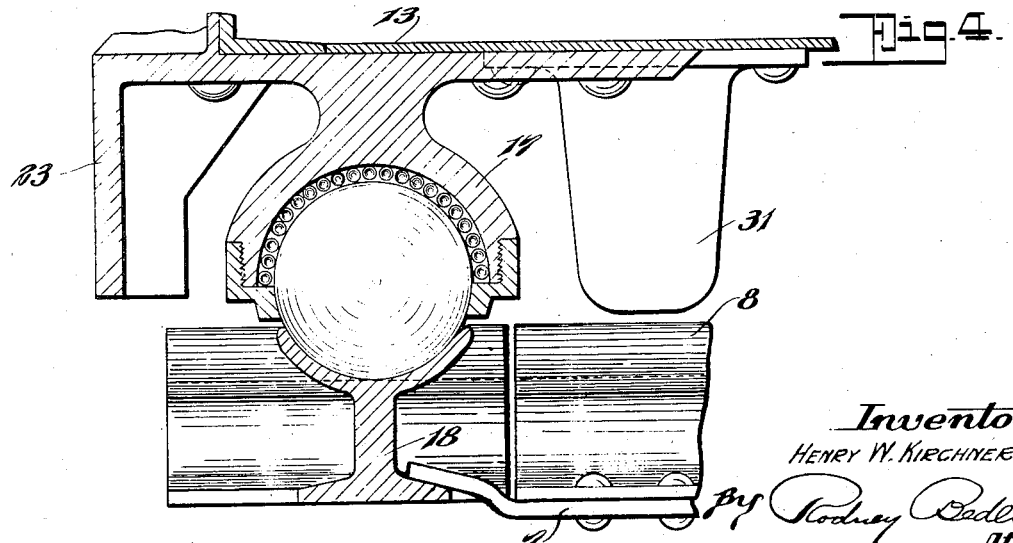
Figure 4 is an enlarged detail of a section of one of the containers mounted upon a transfer track.

Cars to be used in my system resemble the ordinary flat car in general appearance and are adapted to mount merchandise containers upon their platforms. A form of these containers is illustrated in Figures 2 and 3 and consists in a rigid underframe of longitudinal and transverse beams 13 having a skeleton superstructure 14 for the purpose of carrying and retaining lumber or structural beams 15 as indicated in Figure 3. These containers are provided in units of such size that a number of them can be mounted upon a single carrier 16 and may be mounted either close to each other as shown in Figures 1 and 2 or at spaced intervals as shown in Figure 3. Each of these containers projects beyond the sides of the carrier floor and is there provided with a supporting element here shown as comprising an anti-friction caster 17 by means of which element the container may be rolled about a platform 3 or warehouse floor and over a series of tracks formed of concave rails 18. The tracks 5, 10, 11 and 12 are formed of these concave rails 18 and it will be apparent that as a carrier 16 is moved along one of tracks 4 toward the warehouse the inclined portion 6 of the ramp tracks will engage casters 17 and elevate the containers above the carrier platform, thus releasing the car from its load. From then on the container may be moved over tracks 5, 10, 11 and 12 without danger to the carrier and with little effort.

It will be noted that the positioning of casters 17 on the containers is such that there is a wide gauge transversely of the container and a narrow gauge longitudinally of the container. The transverse wide gauge corresponds to the gauge of ramp tracks 5 and the longitudinal narrow gauge corresponds to the gauge of tracks 10, 11 and 12. By this arrangement, the left-hand container A, for instance, shown in Figure 1, may be moved to the left until its casters align with tracks 12 from whence it may be moved at right angles along tracks 12 to another ramp track 5 or to a storage or unloading position at any point on track 12.

In front of each warehouse door wall a circle track 19 is provided, the diameter of which corresponds to the diagonal of one of the rectangles formed by the intersection of a narrow gauge track 12 with the broad gauge ramp track 5. When container A is moved to the point of intersection of these tracks extending at right angles it may not only be moved at right angles to its previous direction but it may be turned in a partial or complete circle, and consequently may be moved into the warehouse on track 11 either at the first warehouse door or at any other door by movement along track 12.

Obviously the carrier 16 may be pulled out from beneath the containers supported upon ramp tracks 5 and go into immediate service without waiting for the containers to be unloaded. In other words, a loaded carrier or a train of loaded carriers could be run in between the rails of a ramp track and immediately pulled out empty.

To provide for positive movement of the containers along the ramp tracks when being raised from the car floor and to provide for release of the containers from the car, suitable container engaging and disengaging mechanism is necessary and such is detailed in Figures 5 and 6. In these figures the car floor is indicated at 20 and the car side sill at 21. A portion of a container 13 is shown with its anti-friction supporting element 17 projecting beyond the side of the car. This supporting element is preferably mounted in a frame element 22 which extends beyond the side of the container lengthwise of the latter, as well as crosswise, to form a bumper 23. Vertical pockets 24 are provided on the inner face of the car side sills 21 and slidable in these pockets are posts 25 which may be projected above the car floor as shown to engage the containers or may be retracted below the car floor to permit movement of the car independently of the container, this relative movement taking place of course when the containers are supported upon the ramp tracks.

To elevate and lower the posts 25 a bell crank 26 is pivoted at 28 on the car side and one arm of this bell crank is pivotally connected to posts 25 by a link 27 and the other arm of the bell crank is pivotally connected by a link 29 to a rod 30 extending longitudinally of the car and similarly connected to other bell cranks for other posts. These posts are to be located at intervals along the car either corresponding to the length of containers A or at distances commensurate with the length of the containers. Rods 30 may be operated by hand or by air and when they are moved in one direction they will swing bell cranks 26 about the pivots of the latter so as to raise posts 25 and when moved in the other direction they will swing the bell cranks oppositely to lower posts 25. These posts are relied upon to engage the containers when the latter are being loaded upon or unloaded from the car by means of the ramp tracks. While the cars are en route the containers are prevented from shifting upon the car floors by the interengagement of dowels 31 and suitable pockets 32 therefor provided in the floor 20 of the car. The depth of dowels 31 will be less than the rise in ramp tracks 5 so that when the containers are mounted on the horizontal upper portions of the ramp tracks these dowels will clear the car floor. The maximum projection of post 25 above the car floor is great enough to engage the containers even when the latter are raised above the car floor by the ramp tracks.

When loading, such as lumber, is being transported, it is unnecessary to have a continuous supporting surface and the provision of containers the full length of the car would be superfluous. At the same time it would be necessary to hold the containers in certain relations to each other when the containers were on the ramp or transfer tracks. To take care of this problem I have provided spacing members 33 (Figure 3) each of which is hinged on one container and provided with a hook-shaped end adapted to engage a suitable element 34 upon the container. Of course when the containers are on the car they are prevented from longitudinal shifting by their dowels 31 and the car floor sockets 32. When not in use these members 33 may be turned back as indicated in dotted lines near the center of Figure 3 or they may be removed from the container altogether. At the left of Figure 3, another use of member 33 is indicated. Here they are hooked onto a cross brace 41 to hold the end of the load against shifting.

With a car and container arrangement of this description it is of course impossible to have a brake mast arising from the car floor or projecting in any manner so as to interfere with the free movement of the containers on and off of the cars. In Figures 7 and 8 I have illustrated a brake arrangement which is somewhat automatic and which does not project above the car floor so as to interfere with the relative movement of the containers. In this arrangement the brake rigging will be of the usual type and include an ordinary brake chain 35 which will be wound upon the brake drum 36 consisting of a short length of shafting mounted in the box 37 and supports 38 and 39. The lower portion of this brake drum is provided with a beveled pinion 40 adapted, when lowered, to mesh with another beveled pinion 42 mounted upon a horizontal shaft 43 which carries a worm wheel 44 at its other end and this worm wheel is driven by a worm 45 carried by the car axle 46. A coiled spring 47 in box 37 tends to hold drum 36 in the high, pinion disengaging position shown in the drawings. The upper end of drum 36 is provided with a disk 48 which may be pressed downwardly by the foot of a brakeman or other workman until a shoulder 49 is engaged by a spring catch 50 which holds the drum in a low, pinion engaging position whereby the movement of the car will rotate worm 45, wheel 44, pinions 42 and 41 and drum 36 so as to wind up chain 45 and set the brakes. It is immaterial in which direction the car is moving as chain 35 will be wound on drum 36 irrespective of the rotation of the latter. Foot pressure upon the pin 51 will withdraw catch 50 and release shoulder 49 and drum 36 from the axle engagement and permit the brakes to be released.

The above described system makes possible the loading and unloading of any kind of freight practically instantaneously and without damage. No cranes, derricks or other machinery is necessary. It will be understood that the container engaging posts are selectively operated so that one or more containers may be unloaded upon the ramp tracks as desired. At large terminals the facilities thus provided for the loading and unloading of quantities of freight should release immense numbers of cars for their intended use and eliminate their use as storage houses.

Throughout this specification I have referred to the carrier in the form here illustrated and described, namely, a railroad car, but it will be understood that other forms of carriers may be used with the same system of ramp and transfer tracks and it will be understood that closed containers such as described in my copending application Serial Number 561,404 may be used as well as the open containers here illustrated.

I claim:

1. In a freight transfer system, a carrier, freight containers adapted to be carried thereby, and a series of tracks crossing each other and located above the height of the carrier floor, said containers being provided with caster-like members for moving over said tracks.

2. In a freight transfer system, a carrier, a freight container adapted to be carried thereon and provided with caster-like supports, tracks adapted to engage said supports and arranged to permit said container to be rolled off of the carrier, tracks intersecting said first-mentioned tracks, and so arranged that said container may be turned thereon.

3. In a freight transfer system, a carrier, freight containers adapted to be carried thereby and provided with caster-like supports, and a series of tracks adapted to be engaged by said supports and arranged at angles to each other and including sections for turning said containers so that they may be moved over different tracks.

4. In a freight transfer system, a carrier, freight containers adapted to be carried thereby and provided with caster-like supports located beyond the sides of said carriers, ramp tracks paralleling the sides of the carrier and adapted to engage said container supports as the carrier is moved between the ramp tracks, to raise the latter from the carrier, and transverse tracks crossing said ramp tracks and adapted to receive said supports.

5. In a freight transfer system, a carrier, a container adapted to be carried thereon, ramp tracks between which said carrier may move and which will engage said container and raise the same from the carrier, elevated tracks having a different gauge than said ramp tracks and located between them beyond a point to which said carrier may move, and a circular track intersecting said ramp tracks and elevated tracks whereby said container may be shifted from one to the other.

6. In a freight transfer system, intersecting tracks of different gauges, a circular rail passing through the intersection of the rails of said tracks, and a rectangular container having four caster-like supports arranged at its corners, the distance between opposite supports lengthwise of the container corresponding to the gauge of one of said tracks and the distance between opposite supports crosswise of the container corresponding to the gauge of the other of said tracks.

7. In a freight transfer system, a rectangular container having caster-like supports at its four corners, a track having a gauge corresponding to the distance between the supports arranged longitudinally of the container, a track paralleling said first-mentioned track and located between the rails of the same and having a gauge corresponding to the distance between the supports arranged transversely of the container, and a single rail in the form of a circle intersecting said tracks and having a diameter corresponding to the distance between the container supports arranged diagonally of the container.

8. In a freight transfer system, a carrier and a plurality of freight containers mounted on said carrier and adapted to cooperate with each other to carry freight and to be moved onto and off of said carrier as a rigid unit.

9. A freight transfer system, a carrier and a plurality of freight containers mounted on said carrier in spaced relation to each other and adapted to cooperate with each other to form a rigid unit for carrying merchandise in the form of articles too long to be loaded on a single container.

10. In a freight transfer system, a carrier and a plurality of freight containers mounted on said carrier in spaced relation to each other and movable onto and off of said carrier, and means for preserving the spaced relation of said container when moving as a unit under a common load.

11. In a freight transfer system, a carrier and a plurality of freight containers mounted on said carrier, each consisting of a skeleton frame having horizontal beams disposed transversely of the carrier, side stakes extending upwardly therefrom, and means for rigidly connecting said frames to each other at spaced intervals.

12. In a freight transfer system, a carrier and a plurality of freight containers mounted on said carrier, each consisting of a skeleton frame extending beyond the sides of the carrier and there provided with antifriction support members, and ramp tracks paralleling the container and adapted to engage said container support members and to raise the container from the carrier as the latter is moved along the upwardly inclined portions of the ramp tracks.

13. In a freight transfer system, a carrier, a container mounted thereon, posts projectable and retractable through the carrier so as to engage or disengage said container horizontally, and means controlled from a remote point for operating said posts.

14. In a freight transfer system, a carrier, a container mounted thereon, posts projectable and retractable through the carrier so as to engage or disengage said container horizontally, and means extending longitudinally of the carrier and connected to each of said posts and adapted to operate the latter simultaneously.

15. In a freight transfer system, a carrier, a container mounted thereon, posts projectable and retractable through the carrier so as to engage or disengage said container horizontally, vertical bell cranks pivoted to the container, respective links connected to one arm of each bell crank and to the lower end of an adjacent post, and a rod extending longitudinally of the carrier and connected to the other arm of each bell crank whereby all of said posts may be operated simultaneously.

16. In a freight transfer system, a carrier, a plurality of containers thereon, posts projectable and retractable through the floor of said carrier to present an engaging surface opposed to the ends of adjacent containers, said containers being provided with bumpers which extend into and in engagement with each other and space the post engageable surfaces of the containers from each other a greater distance than the width of said posts.

17. In combination, a carrier, a container mounted thereon, a bumper on said container, container engaging posts on said carrier, and other interengaging elements on said carrier and container.

18. In combination, carriers, a carrier track, containers on said carriers, an antifriction support element on said containers, a ramp track for engaging said anti-friction supporting element to raise said containers from said carrier, bumpers on said containers adapted to engage each other, posts on said carrier adapted to engage said containers when the containers are elevated, and interengaging elements on said carrier and containers for securing the latter against shifting when the containers are seated on the carrier.

19. In combination, parallel tracks, skids adapted to be placed between and adjoining said tracks, and containers adapted to be moved at right angles to said tracks over said skids.

20. In combination, parallel tracks, movable skids adapted to be placed between and adjoining said tracks at desired positions along the same, and containers adapted to be moved at right angles to said tracks over said skids.

21. In combination, parallel tracks, ramp tracks associated therewith, skids adapted to be placed between and adjoining said ramp tracks at desired positions along the same, and containers adapted to be moved at right angles to said ramp tracks over said skids.

22. In combination, a series of tracks of different gauges, circle tracks intersecting said tracks, containers mounted on revolving ball supports adapted to be moved on all of said tracks.

23. In combination, a series of tracks of different gauges, circle tracks intersecting said tracks, containers mounted on revolving ball supports adapted to be moved on all of said tracks, and ramp tracks connecting with the tracks of said series.

24. In combination, elevated tracks of different gauges, circle tracks intersecting said tracks, merchandise containers having dowels projecting downwardly from their floors and being mounted on revolving ball caster supports adapted to be moved on each of said tracks, ramp tracks inclined and connecting with said elevated tracks, and a carrier with spacing sockets adapted to receive said dowels when said containers move down said ramp tracks and onto said carrier.

25. In combination, an elevated platform, a carrier, a merchandise container with revolving ball caster supports, a ramp track, the rails of which receive said casters, and a level extension of said ramp track flush with said platform.

26. In combination, intersecting tracks of different gauges, a circle track intersecting said tracks, a merchandise container having revolving ball caster supports at different distances from each other to fit each of said tracks.

27. In combination, a container having revolving ball caster supports arranged at the corners of a rectangle, tracks of different gauges, a circle track intersecting said tracks and in diameter coinciding with the diagonal of said rectangle.

28. In combination, parallel tracks, cross tracks adjustable longitudinally of said parallel tracks, and containers movable over said parallel tracks and over said cross tracks.

29. In combination, parallel tracks, containers movable thereover, and adjustable skids for transferring said containers from one of said parallel tracks to another.

30. In combination, parallel tracks having grooved rails, the groove walls of which are cut away at right angles and provided with lateral groove extensions, removable skids and parallel grooved rails mounted on said skids and spaced apart so as to align with two of said extensions to form transfer means between said tracks.

31. In combination, parallel tracks having grooved rails, the groove walls of which are cut away at right angles and provided with lateral groove extensions, removable skids and parallel grooved rails mounted on said skids and spaced apart so as to align with two of said extensions to form transfer means between said tracks, and merchandise containers having revolving ball support members adapted to move along said grooved rails.

32. In combination, a carrier, containers mounted thereon, ramp tracks adapted to engage said containers and having level portions, a platform of the elevation of the level portion of said ramp tracks and having tracks of different gauges, and a circle track intersecting the platform tracks to permit a movement of said containers in any direction.

33. In combination, a platform with tracks at right angles to each other, a circular intersecting track, said tracks having concave rails, and merchandise containers having ball caster-like supports adapted to revolve in any direction and fitting in the concave portions of said rails.

34. In combination, a carrier having container spacing sockets and spacing posts operated in pairs, a ramp track with a level continuation, tracks intersecting said level continuation of said ramp track, a circle track intersecting the other tracks, containers with spacing dowel, spacing bumpers and spacing bars adapted to maintain said containers at distances corresponding to said carrier spacing sockets and posts.

35. In a freight transfer system, a railway car, and a plurality of wheeled freight containers mounted on said car and adapted to cooperate with each other to carry freight and to be moved onto and off of said car as a rigid unit.

36. In a freight transfer system, a carrier, and a plurality of freight containers mounted on said carrier, each adapted to be moved individually with a load of freight and adapted to cooperate with an adjacent carrier to be moved therewith as a unit.

In testimony whereof I hereunto affix my signature this twenty-sixth day of May, 1923.

HENRY W. KIRCHNER.